(12) United States Patent
Hartshorne

(10) Patent No.: US 8,266,945 B2
(45) Date of Patent: Sep. 18, 2012

(54) DEVICE FOR REMOVING AIR DISPERSED CONTAMINANTS

(76) Inventor: Bryn Hartshorne, Novi, MI (US)

( * ) Notice: Subject to any disclaimer, the term of this patent is extended or adjusted under 35 U.S.C. 154(b) by 534 days.

(21) Appl. No.: 12/460,578

(22) Filed: Jul. 21, 2009

(65) Prior Publication Data

US 2010/0024522 A1    Feb. 4, 2010

Related U.S. Application Data

(60) Provisional application No. 61/135,619, filed on Jul. 21, 2008.

(51) Int. Cl.
*G01N 1/20* (2006.01)
(52) U.S. Cl. ............ 73/28.04; 73/31.07; 73/31.02; 73/863.22
(58) Field of Classification Search ............... 73/28.04, 73/31.07, 31.02, 863.22
See application file for complete search history.

(56) References Cited

U.S. PATENT DOCUMENTS 5,866,000 A * 2/1999 Yeh .................. 210/295
6,974,842 B1 * 12/2005 Spena et al. ............ 518/700

* cited by examiner

*Primary Examiner* — Hezron E Williams
*Assistant Examiner* — Paul West
(74) *Attorney, Agent, or Firm* — John R. Benefiel

(57) ABSTRACT

A device for removing liquid or solid contaminants such as oil or dust dispersed in air in which an air flow is directed through a space formed by a spiral wall in a cyclonic chamber condenses the particles or droplet which drops down into a collection chamber below the cyclonic chamber while the cleaned air passes out through an outlet extending back up through the cyclonic chamber. A baffle plate array is located at the bottom of the collection chamber composed of spaced apart shallowly inclined partially overlapping plates which captures any cyclonic air flow at the bottom of the collection chamber. This removes contaminants which would otherwise accumulate at the center of the bottom of the collection chamber and be entrained in the air exiting the device.

7 Claims, 13 Drawing Sheets

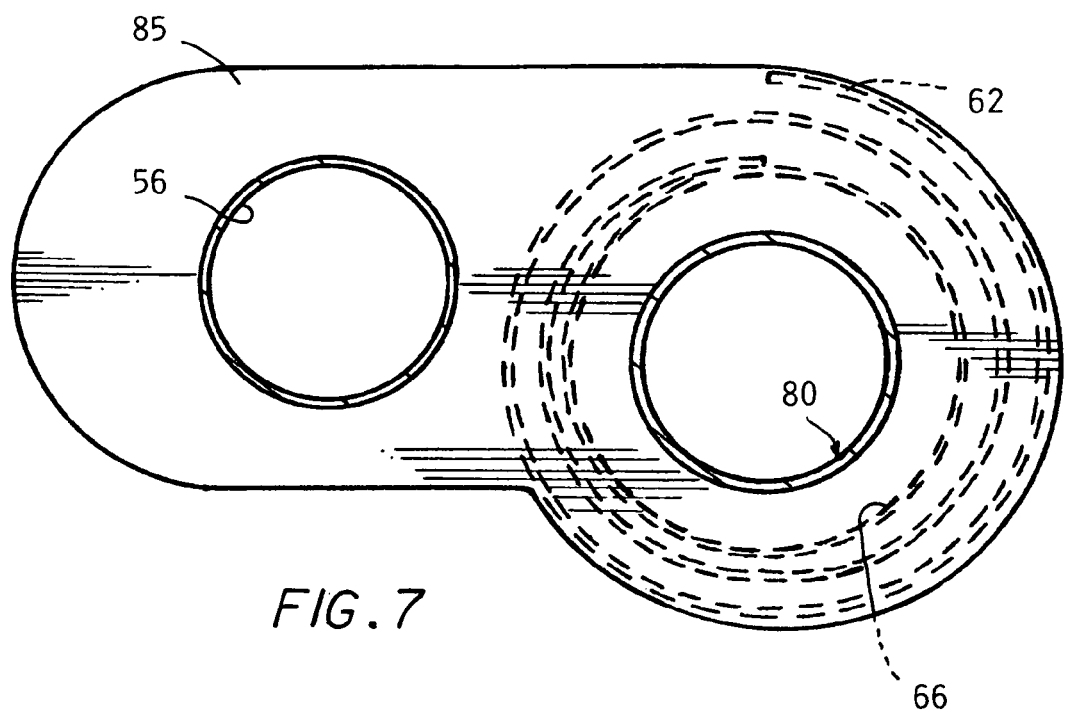
FIG. 7
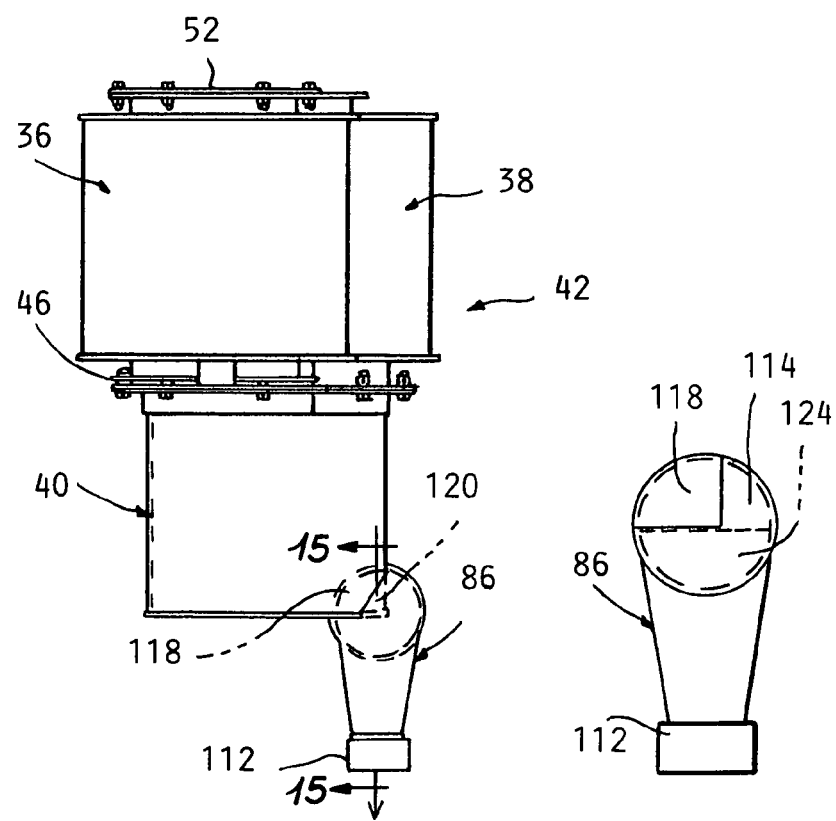
FIG. 3
FIG 3A

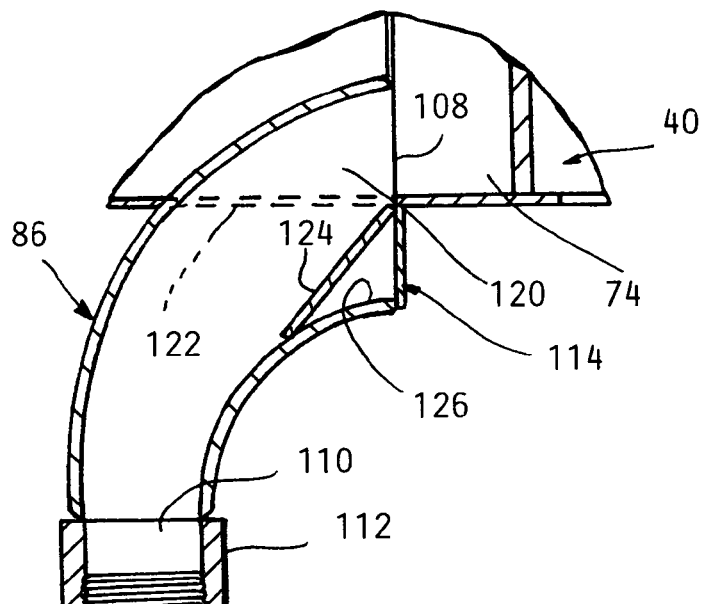
FIG. 15
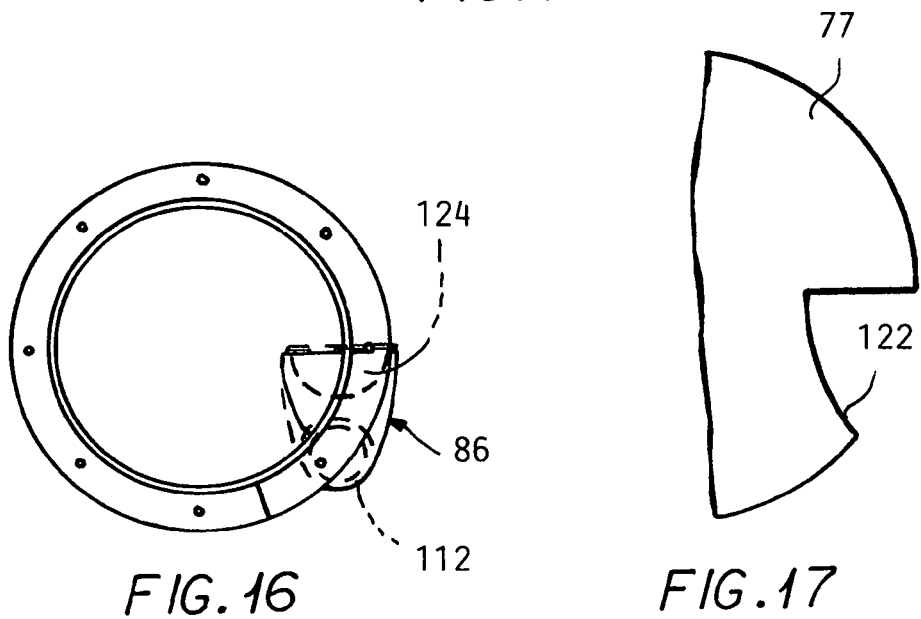
FIG. 16
FIG. 17
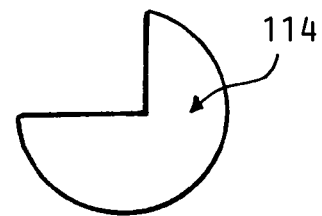
FIG. 18
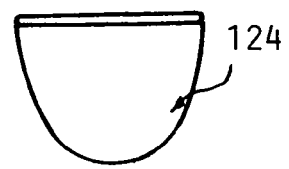
FIG. 19

DEVICE FOR REMOVING AIR DISPERSED CONTAMINANTS

CROSS REFERENCE TO RELATED APPLICATIONS

This application claims the benefit of U.S. provisional patent application Ser. No. 61/135,619, filed on Jul. 21, 2008.

BACKGROUND OF THE INVENTION

This invention concerns air dispersed oil or dust or other solid or liquid contaminant collectors of a type described and claimed in corresponding U.S. patent application published as 2008/0105129-A1.

That application describes an oil mist collecting system which includes an individual oil mist collector at each station of a series of machine tools and directing the demisted air to a central air filtration unit such that transporting mist laden air over substantial distances is avoided.

The oil mist collectors are of a spiral coil design in which mist laden air is directed in to the space between turns of a spiral wall, with the turns oriented vertically so that condensed oil drains down (along with any chips or fines) into an associated individual mist collection tank which in turn drains into a machine tool sump (or return chute or trench) to be handled by the system cutting fluid filtration apparatus, eliminating the need for disposal of the collected oil.

The spiral coil is held in a housing assembly which can be installed in line with a mist inlet, air collection ducting and drainage connections with simple inline connections to mist inlet ducts and air outlet ducts as well as to a drain.

The condensed oil is collected in an individual collector tank located immediately below the drain and drainage is controlled by drain valves of a special design which prevent entry of a back flow of air from being drawn in over the collected oil. These valves preferably accommodate any chips or other debris.

The location of the collection chambers immediately below the spiral coil exposes the collected oil and chips to a cyclonic air flow which retards settling out of the chips and drives the oil and chips out to the outer wall where a drain opening is located to receive the collected oil and chips and pass the same to the drain value.

While this type of contaminant removal device has been successful in oil demisting, there has been found a tendency for some oil misting to redevelop in the air flow as a result of contact with oil that has been found to accumulate at the center of the bottom of the collection chamber. It has been found that the condensed oil tends to puddle in the center and erupt into the return air flow which is flowing up to the air outlet. This recreates some oil misting in the outflow air.

The cyclonic flow technology has also been applied to removal of solid air dispersed contaminants such as dust. However, in the past, such dust collectors have been very tall due to the tendency for dust to be drawn back into the outlet air flow if the outlet was too close to the bottom of the collection chamber.

It is an object of the present invention to provide improved performance of the type of air dispersed contaminant removal device described by substantially eliminating the tendency for redevelopment of oil misting in the air flow exiting from the collection chamber.

It is a further object to provide a dust an air dispersed solid or liquid contaminant removal device of the same type which is of shorter height due to performance of the collector.

SUMMARY OF THE INVENTION

The above recited objects as well as other objects which will be understood by those skilled in the art upon a reading of the following specification and claims, are achieved by adding a vertical array of vertically spaced apart, aligned but partially overlapping and upwardly angled baffle plates at the bottom of the collection chamber of a cyclonic type contaminant removal device with a the collection chamber located just below the cyclonic air flow chamber. The baffle plates are preferably semicircular with the overlapping half portion of each plate extending up over the lower portion of the next below plate in the stack.

The residual cyclonic air flow at the bottom of the collection chamber is captured by the upturned leading edges of the plates to direct air flow between the baffle plates and thereby is made to encounter the undersurface thereof, and thereafter making its way up to the central area of the collection chamber to the air outlet.

Any oil droplets or other contaminants which are entrained in the upward air flow tends to be condensed on the underside of each of the baffle plates and by gravity fall back down to the lower ends of the plates due to the inclination of these baffle plates.

The collected liquid contaminant then drips off the lower edges of the baffle plates to the bottom of the collection chamber where it exits through the drain fitting as before.

The same result occurs in an air dispersed solid contaminant removal device where dust or other particles collect on the underside of the plates and fall through the open bottom of the collection chamber, and into an external vessel for periodic disposal. The collection chamber can be of a much shorter height due to the improved performance afforded by the baffle plate array.

DESCRIPTION OF THE DRAWINGS

FIG. 3 is a side view of the device shown in FIG. 2.

FIG. 7 is a view of the section 7-7 taken in FIG. 4.

FIG. 15 is a view of the section taken along the line 15-15 in FIG. 3 through a drain fitting and integrated collector tank.

FIG. 16 is a top view of the integrated collector tank.

FIG. 17 is a plan view of integrated collector tank showing a cutout for the drain fitting.

FIG. 18 is a plan view of a partial plug for the drain fitting.

FIG. 19 is a plan view of a diverter insert welded to the drain fitting.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
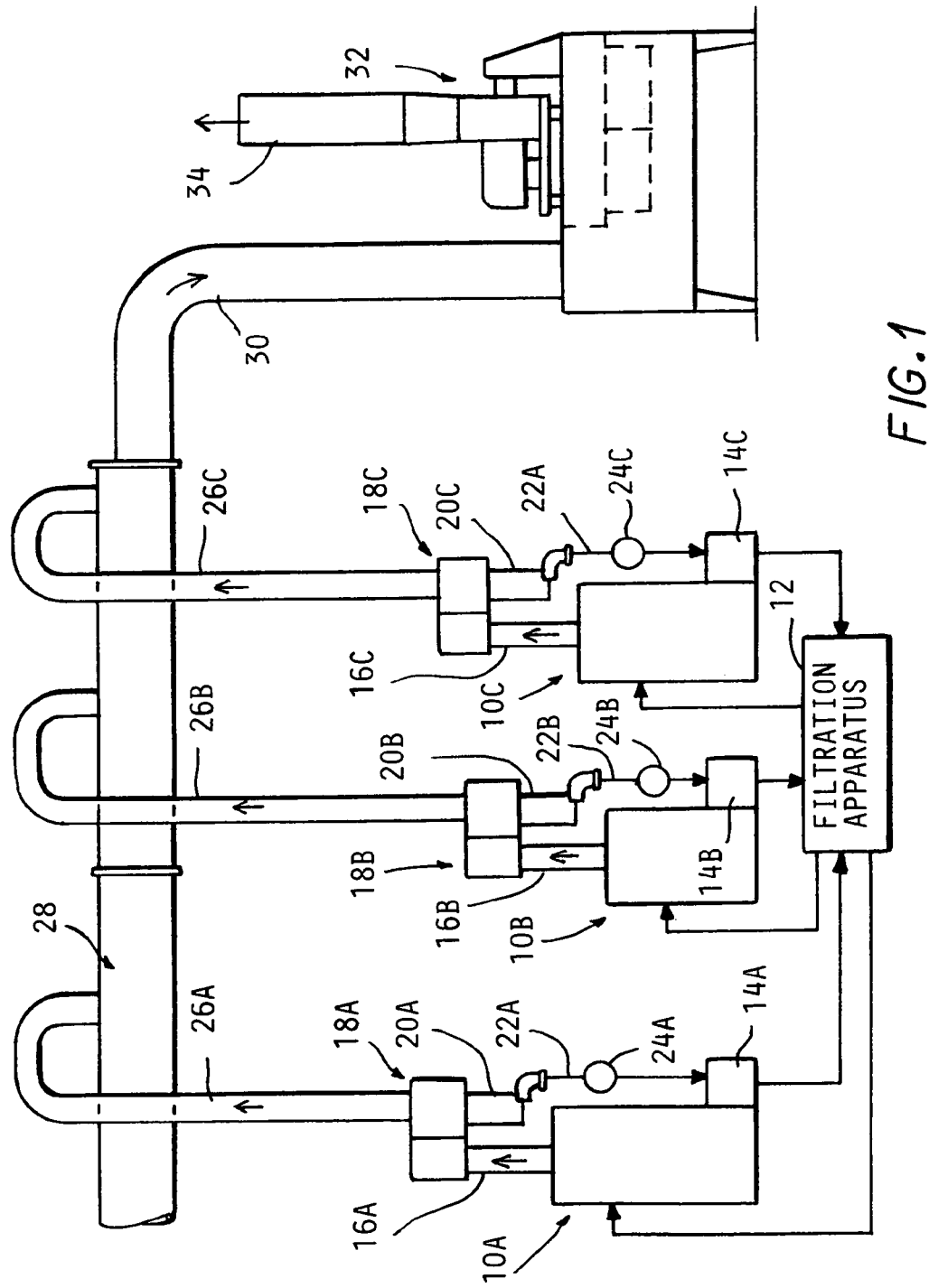
FIG. 1 is a diagrammatic representation of an oil mist collection system according to the present invention associated with a plurality of machine tools.

Referring to the drawings and particularly FIG. 1, the invention described in U.S. 2008/0105129 A1 includes a series of machine tool stations 10A, 10B, 10C. Each machine tool station 10A, 10B, 10C is supplied with clean cutting fluid from a filtration apparatus 12. The coolant is sprayed at the parts and cutting tools in the well known manner and drains down from the part and tools to be collected, along with the chips and other machining debris in a sump 14A where it can be pumped back to the filtration apparatus 12. Other arrangements may include a below grade trench or above grade trough to return the dirty coolant and debris to the filtration apparatus 12 as is well known in this field.

The mist laden air in the vicinity of each machine tool station 10A, 10B, 10C, is collected in a short duct 16A, B, C and drawn into a respective individual oil mist collector assembly 18 described in detail below.

The condensed oil and machining chips and other debris is collected in integrated drain tanks 20A, 20B, 20C installed below each oil mist collector device 18A, B, C and thereafter directed via a drain line 22A, 22B, 22C and drain valve 24A, 24B, 24C back to the dirty coolant collection space such as sumps 14A, B, C as indicated in FIG. 1.

The demisted air is drawn up out of each oil mist collector device 18A, B, C via vertical stacks 26A, B, C and connected to the top of air plenum 28.

The air is drawn down the plenum 28 and through a duct 30 connected to a conventional centralized air cleaner apparatus 32.

The air filter apparatus may include replaceable HEPA filters which remove any residual oil, fine particles, etc. prior to being discharged back into the ambient atmosphere via a stack 34.

It can be appreciated that by removing the oil mist at each station, the air flow back to the central air filter 32 is much less likely to become polluted with oil vapor which cannot be removed with filters.

Furthermore, by discharging the condensed oil back into the coolant collector at each station the need for disposal of the collected oil is avoided.

Finally, as the oil mist collector devices 18A, B, C are passive and do not require controls, etc. and only a single centralized air cleaner apparatus is required, maintenance is held to a minimum and the system is much simplified over demister systems requiring blowers and controls, and air filters at each station.

FIGS. 2-8 show the details of an oil mist collector device 18 suited to this application. Three generally cylindrical sheet metal subhousings 36, 38, 40 integrated together to form a unitary single "in line" housing assembly 42. The first subhousing 36 defines a mist intake chamber 44 connected to a duct 16 collecting mist from a machine tool 10 by a flange 46 welded concentric to an opening 48 in a bottom wall 50. A removable access cover 52 is attached to a flange 54 welded around an opening 56 in a top plate 58.

Located side by side with the intake chamber 44 is a spiral coil chamber 60 defined by a vertically oriented spiral coil wall 62 beginning tangential to the partially cylindrical outer wall 64 defining the sides of the intake chamber 44. The spiral coil wall 62 winds inwardly around the center axis of an outlet hole 66 in the bottom wall 68 of the spiral coil chamber to which it is welded in chamber 60 (which is defined by a plate 68 common with the bottom wall 50 of subhousing 36) becoming of progressively smaller radius until it becomes tangent to the outlet hole 66 where it has a terminus 70.

Mist laden air is drawn into the progressively tighter radius spiral passageway 72 defined between turns of the spiral coil wall 62, flowing tangentially around the axis of the outlet hole 66 constrained by the bottom wall 68 until the passageway 72 reaches the outer perimeter of the outlet hole 66. The centrifugal forces of the mist developed by a decreasing radius circumferential flow cause the air droplets to be condensed on the inner sides of the spiral coil wall 62.

Since the spiral coil wall 62 is vertically oriented, the condensed oil (and any solid debris) flows down to the bottom wall 68 and out the hole 64.

An integrated drain collection chamber 74 is defined by the third subhousing 40 located aligned and immediately below the hole 66 in the bottom wall 68 of the coil chamber 60 by having a flange 78 attached to a flange 76 welded to the bottom wall 68. Being exposed to the cyclonic air flow in the spiral coil work 62 induces a cyclonic air flow in the collection chamber 74 which assists in draining oil and solids collected in the collection chamber 74, as will be discussed below.

An air outlet tube 80 is mounted within the coil chamber 60 concentric to the bottom hole 64 and extending below the bottom wall 68 to protrude into the collection drain chamber 74. Radial supports 82 connected to the flange 76 hold the lower end of the air outlet tube 80 centered in the bottom wall opening 64. The upper end is welded to the top wall 84 of the coil chamber 60 (which may be formed by a top plate 85 common with the top wall 58 of the inlet chamber 44.

The air return duct 26 is connected to the air outlet tube 80 with a flange 81. The collection chamber 74 has a drain fitting 86 welded thereto which connects to drain pipe 22 allowing collected oil and particles to pass out of the chamber 74, and is directly returned to the sumps 14 (or troughs or trenches) so that a separate disposal of oil is not necessitated.

A single oil mist collector device can be sized to accommodate a single station and connected to the air return system with simple duct to duct connections not requiring any transitions, etc.

In order to keep the spiral coil wall 62 surfaces, as well as the bottom wall 68 free from debris, a wash spray header 90 is connected to a pressurized source of clean coolant 92, as from the filtration apparatus to direct a spray of clean coolant against the spiral coil wall 62 to clean any debris from the wall and wash it out.

It is important to prevent air from being drawn back through the drain fitting 86 and into the air outlet, as this will tend to recreate the mist and to cause oil vapor to be added to the air returned to the central air filtration equipment.

For this reason, a specially controlled opening valve 24 is preferably included in each drain line 22 which prevents any entry of air through the oil drain. FIGS. 9-12 show several embodiments of valves intended to accommodate the presence of chips while preventing air from passing back into the collection chamber 74.

Figure 9:
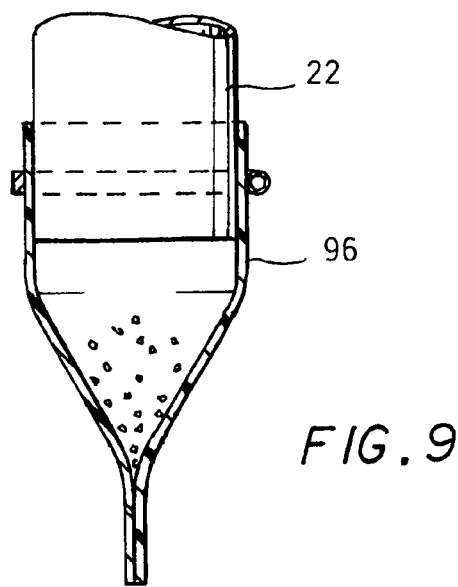
FIG. 9 is a partially sectional view of a drain valve which may be combined with the devices shown in FIG. 1.
Figure 20:
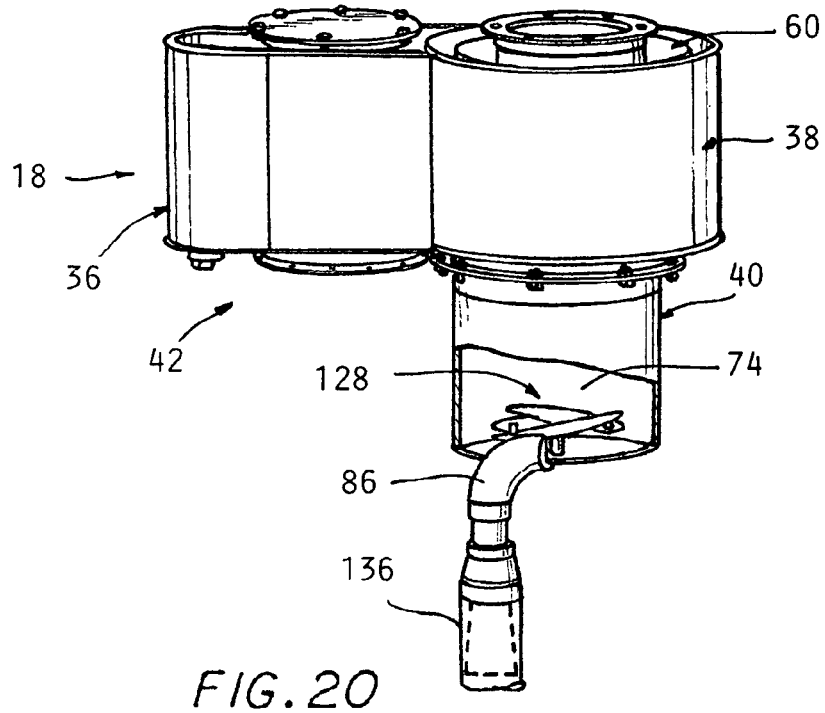
FIG. 20 is a pictorial view of a liquid mist removal device with the collection chamber partially broken away to show the baffle plate arrangement disposed at the bottom of the chamber according to the present invention.
Figure 21:
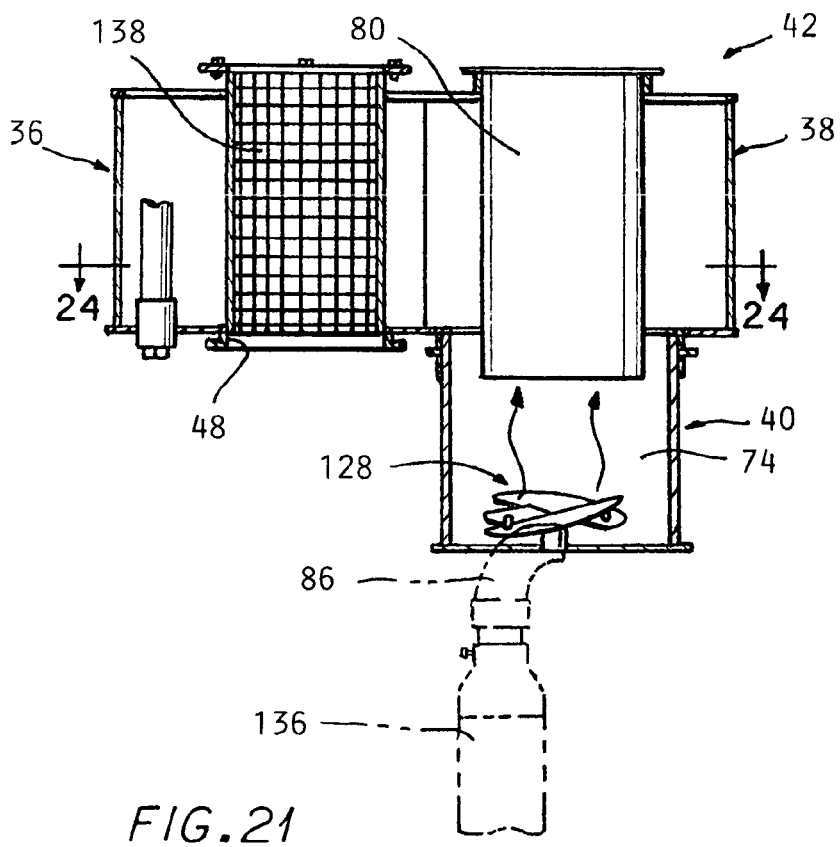
FIG. 21 is an elevational view in partial section of the device shown in FIG. 20.
Figure 22:
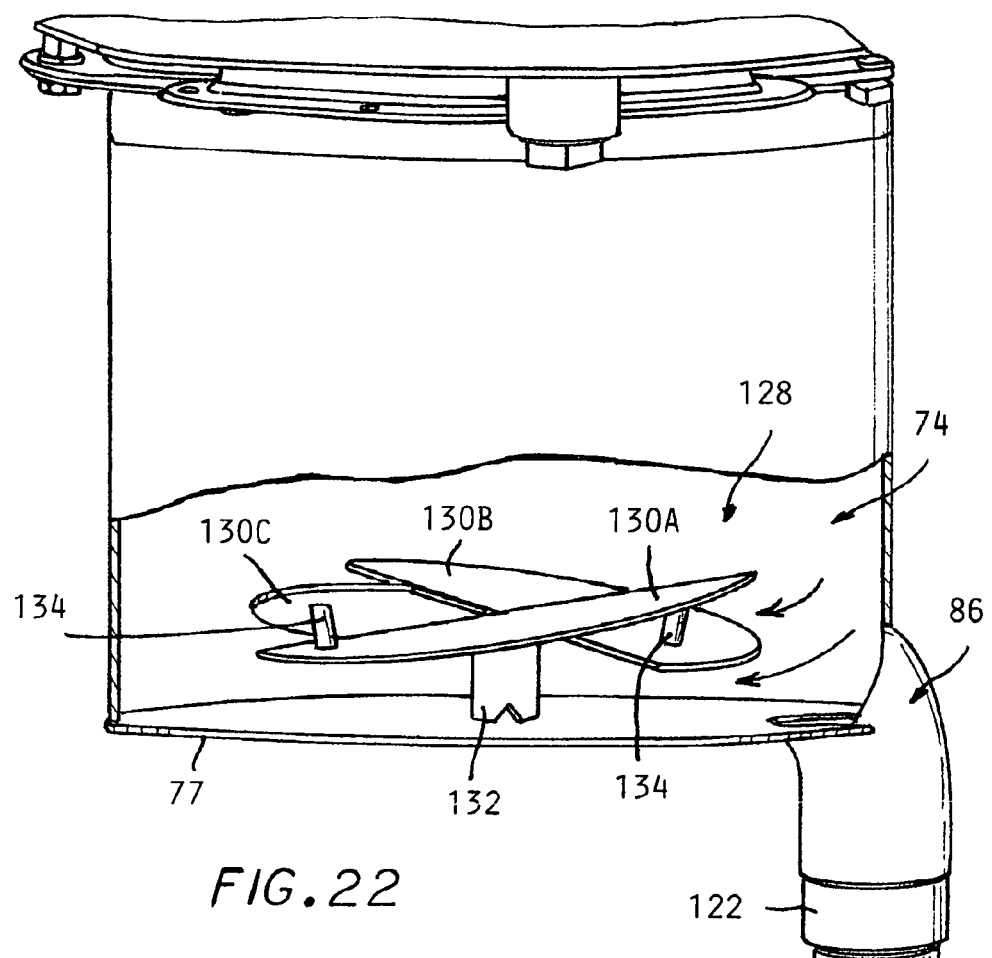
FIG. 22 is an enlarged pictorial view of a fragmentary portion of the device shown in FIGS. 20 and 21 with the collection chamber partially broken away.
Figure 23:
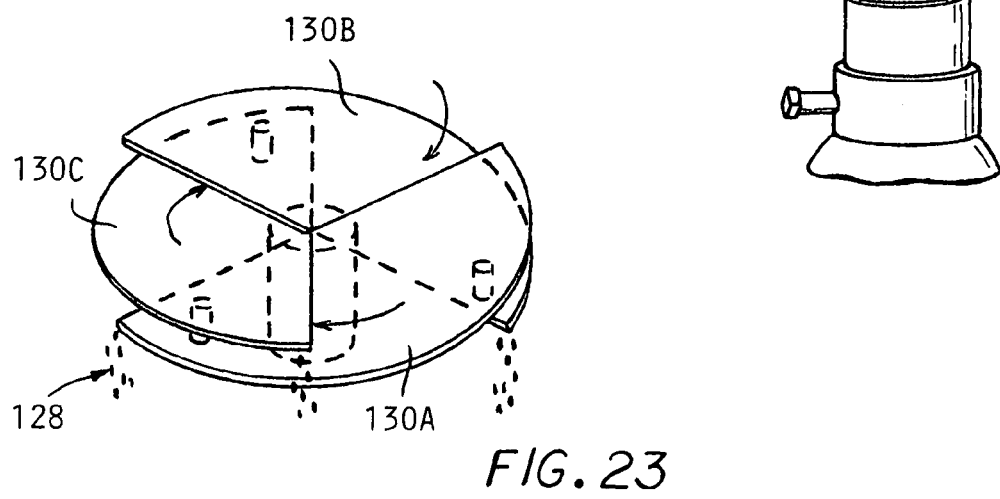
FIG. 23 is a pictorial view of the baffle plate array included in the device collection shown in FIGS. 20-22.

In FIG. 9, a length of flattened hose 96 is clamped to the drain line 22. The vacuum developed by the air filter blower holds the hose 96 flattened so that air cannot enter. As oil and chips accumulate, a weight eventually accumulates sufficient to force the hose to distend sufficiently to allow a portion of the accumulated oil and chips to pass out without opening to the air. The hose 96 is immediately reflattened by the vacuum after the weight of accumulated oil and debris is reduced to a point where the hose 96 can again be collapsed to again seal off the drain line 22.

Figure 10:
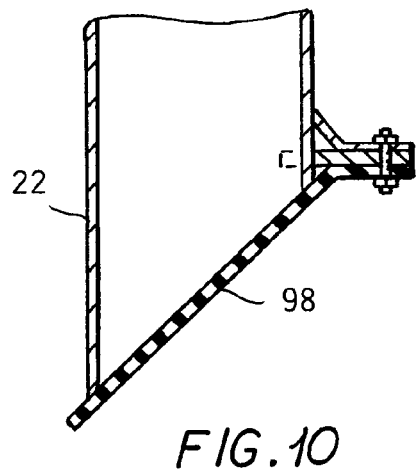
FIG. 10 is a second form of a drain valve preferably combined with the oil mist collector devices shown in FIG. 1.

In FIG. 10, a rubber flap 98 is installed on the angled end of the drain pipe 22. Its resilience and the vacuum keep it closed until a sufficient accumulation of oil and any chips develops to overcome the closing force and causes the flap 98 to open and the oil and chips slide out on the inclined flap, when the remaining weight is reduced to where the closing force reasserts itself immediately to close the valve and prevent the entrance of air.

Figure 12:
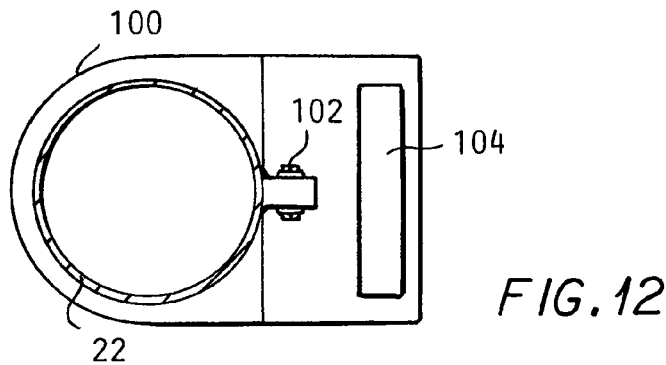
FIG. 12 is a top view of the drain valve shown in FIG. 11.
Figure 11:
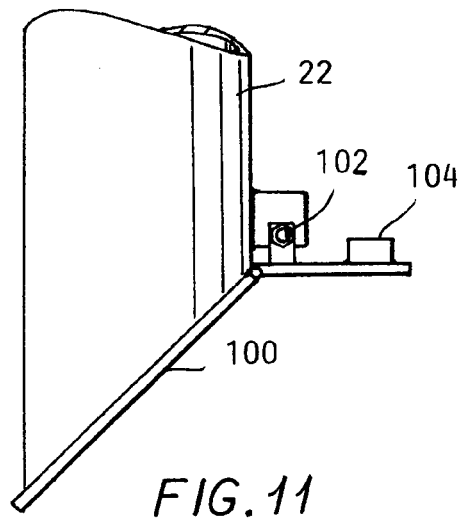
FIG. 11 is a side view of a third form of the drain valve which may be combined with the oil mist collector devices shown in FIG. 1.

FIGS. 11 and 12 show a counterweighted rigid valve flap 100 hinged normally held at 102 to one side of the angled end of the drain pipe 22 and normally held covering the same by the exertion of the weight of a counterweight 102 (and the vacuum force). When the weight of oil and chips reaches a predetermined level, the flap 100 opens and allows discharge of a portion of the oil and chips as described above.

Thus, a simplified oil mist system is provided which minimizes costs and maintenance, and which is simple and highly reliable in operation.

Figure 13:
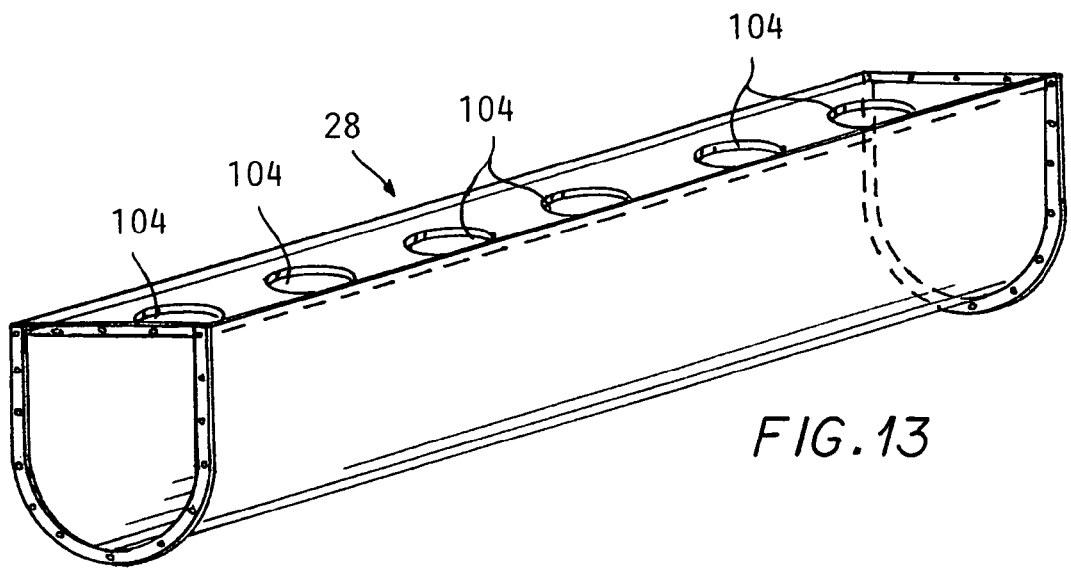
FIG. 13 is a pictorial view of a return air plenum preferably used in the oil mist collection system shown in FIG. 1.
Figure 14:
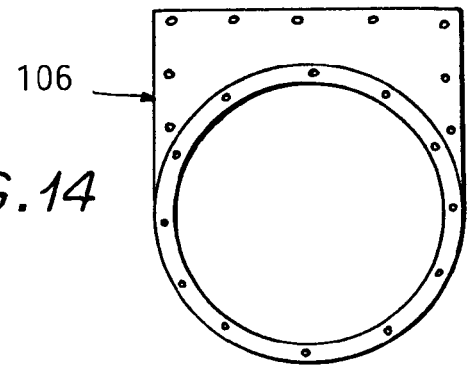
FIG. 14 is an end view of a transition piece used with the air plenum shown in FIG. 1.
Figure 2:
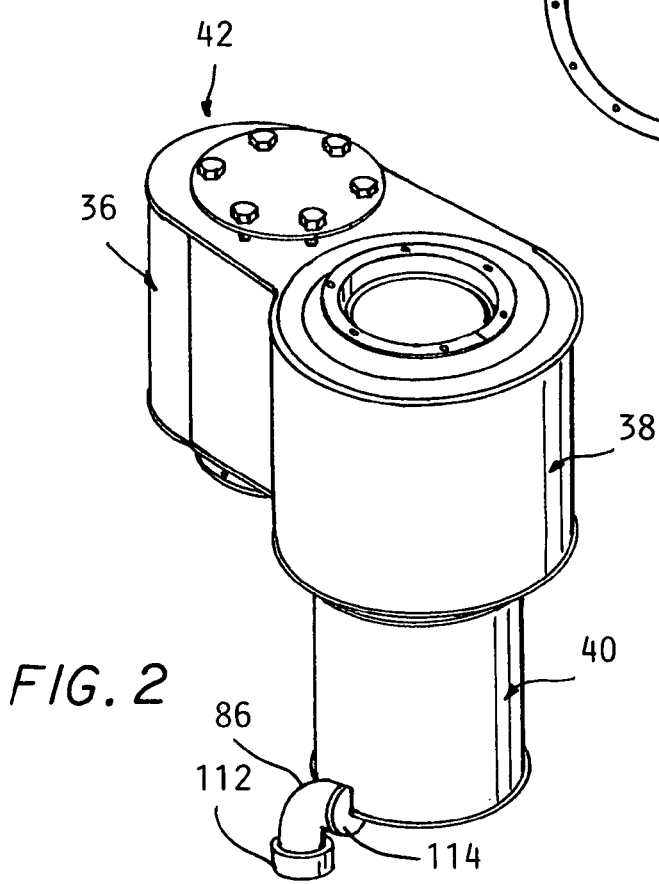
FIG. 2 is a pictorial view of one of the individual contaminant removal devices included in the system shown in FIG. 1.
Figure 5:
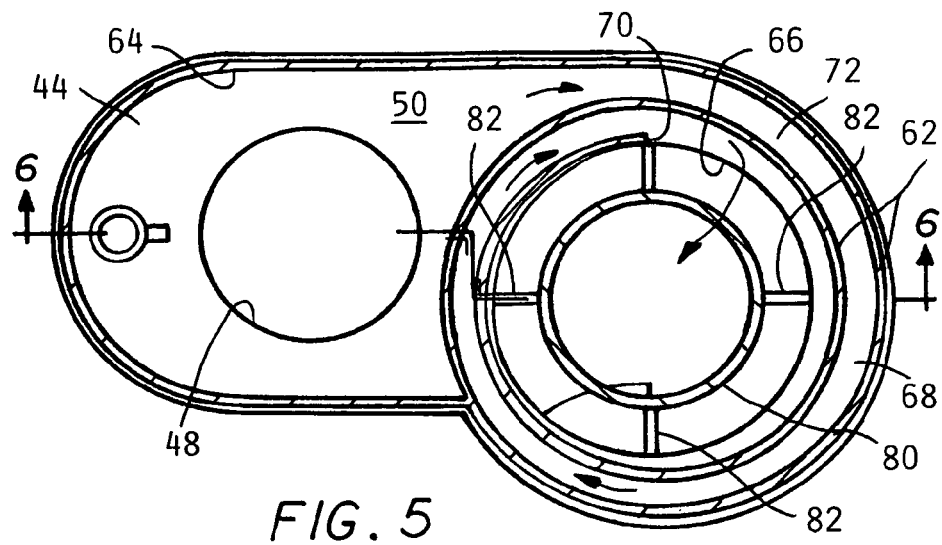
FIG. 5 is a view of the section 5-5 taken in FIG. 4.
Figure 4:
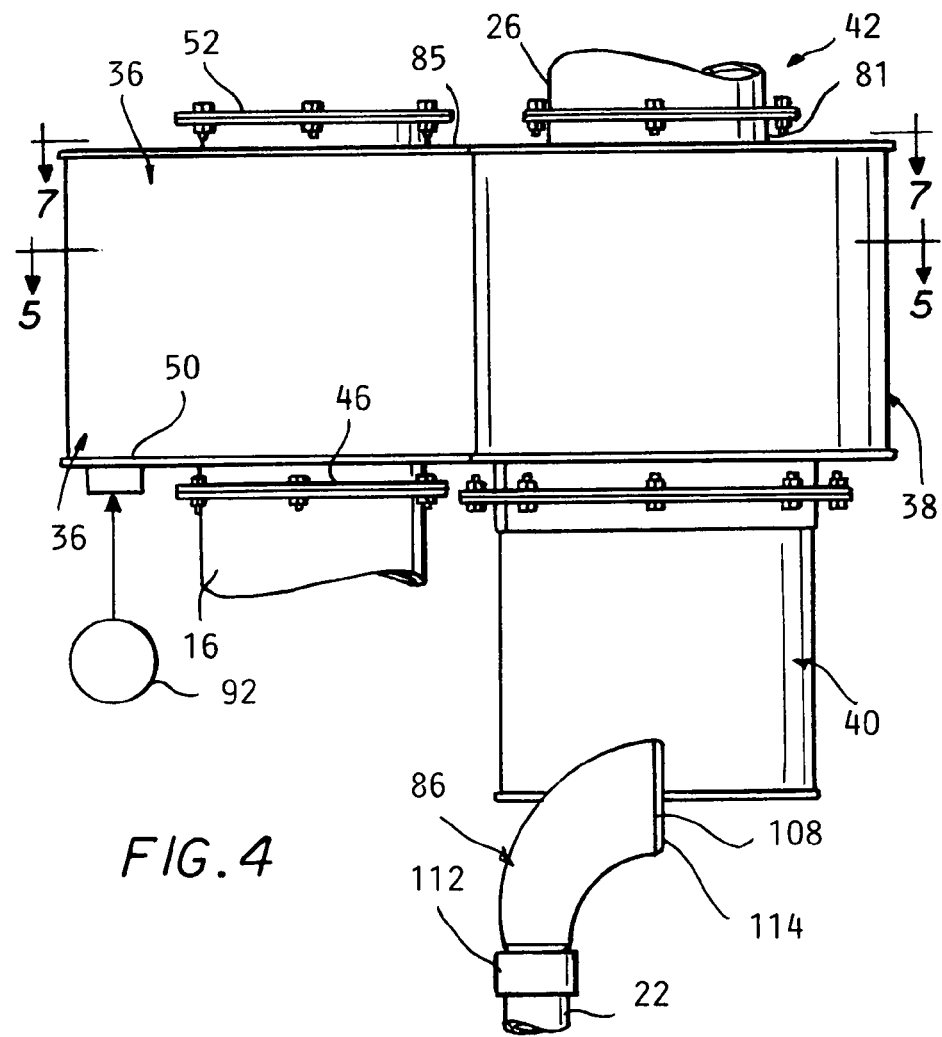
FIG. 4 is a front view of the device shown in FIGS. 2 and 3.

FIGS. 13 and 14 show details of the preferred form of air return ducting, which features a U shaped channel for the horizontal run. Openings 104 in a top wall allow connection of air ducts 26. A transition piece 106 allows connection of round ducts 30 to be connected to the central air filter apparatus 32. The U shape provides the advantages of a round duct in eliminating corners to avoid collection of dirt and oil while enabling a flat surface for connection to the branch ducts 26.

An important aspect of the present invention is to maintain a drainage of the condensed oil and prevent any solids from settling out and causing an accumulation of solids in the system.

Figure 6:
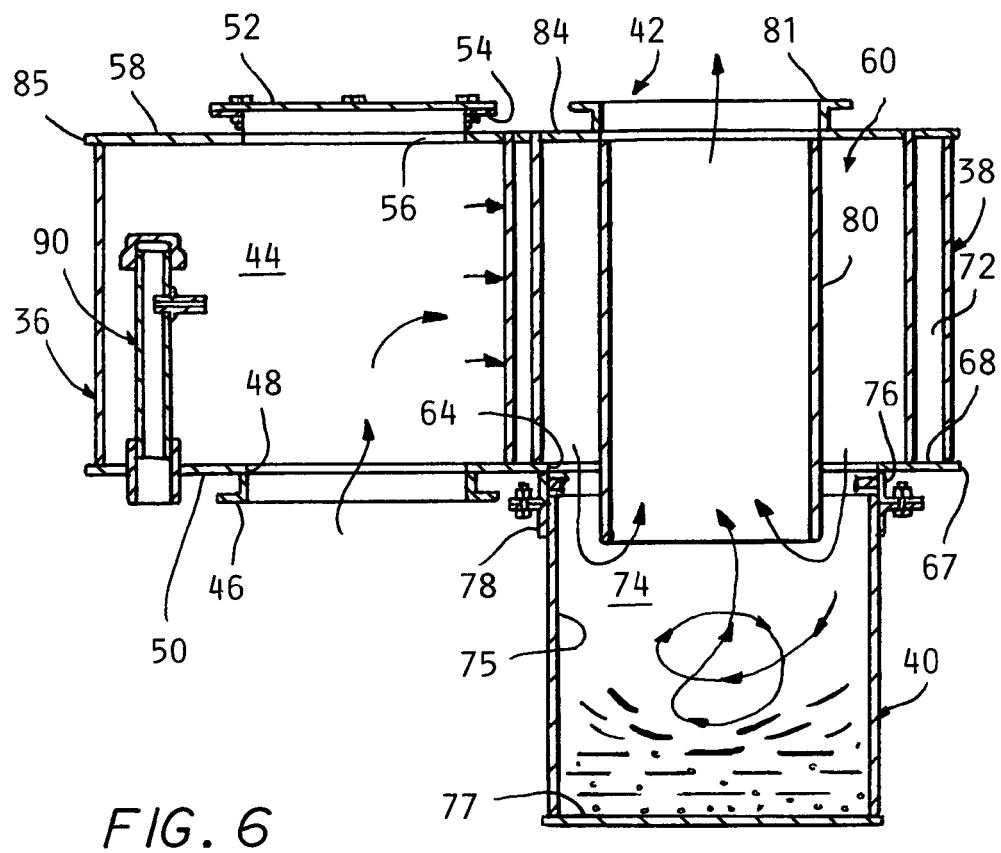
FIG. 6 is a view of the section 6-6 taken in FIG. 5.
Figure 8:
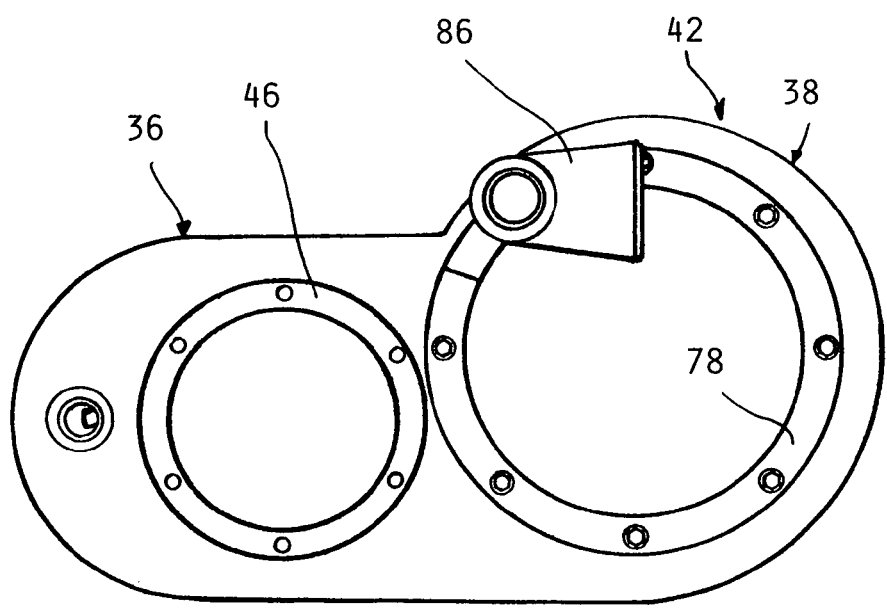
FIG. 8 is a bottom view of the device shown in FIGS. 2 and 3.

As represented in FIG. 6, a cyclonic air flow pattern is established in the drain collection chamber 74 by being open to the bottom of the spiral coil 62. This causes the collected oil and solids to be forced to the outer region of the chamber 74.

To take advantage of this, the drain fitting 86 is tangentially oriented and has an opening communicating with the outer region of the drain collection chamber 74. The drain fitting 86 may be a reducing elbow with a larger (i.e. four inches) end 108 and a smaller diameter end 110 with a coupling 112 threaded thereon welded to be air tight. The larger end 108 is approximately three quarters covered with a cover piece 114 (FIG. 3) leaving an opening 109 in the end 108.

The open quarter 118 of the end 108 opens into the chamber 74. An opening 126 in the sidewall 75 and an opening 122 in the bottom wall 77 both allow the outside of the drain fitting 86 to be recessed into the bottom outside perimeter of the subhousing 40 to which it is welded to be air tight. Thus, the open quarter 109 projects into the interior of the chamber tangentially aligned with the opening 120 in the side wall 75. The oil and debris is being directed tangentially along the wall by the cyclonic air flow such that this open quarter 109 acts as a scoop collector of the oil and solids which passes down through the bottom all opening 122 into the interior of the fitting 86.

A ramp piece 124 is welded into the end 108 to eliminate the crevice 126 formed by cover 114. This arrangement of the chamber 74 exposed to cyclonic air flow and a tangentially directed drain avoids settling out and accumulation therein of solids.

Referring to FIGS. 20-30, the improvement of the present invention is shown which is generally applicable to removal devices for removal of air dispersed liquid or solid contaminants. This includes the liquid and specifically oil mist removal device described above.

The improvement in the oil demister comprises a baffle plate vertical array 128 disposed centered above the bottom wall 77 of the collection chamber 74 below the spiral coil chamber 60 as described above.

The spiral wall 60 can be accurately located in the chamber 60 by a series of small openings 63 machined into the bottom wall 77 along the correct position at the spiral wall 62 on the bottom wall 77. This allows viewing of the spiral wall 62 when correctly positioned and thereafter a weld at each hole 63. An inserted screwdriver can aid in positioning each segment of the spiral wall 62.

The baffle plate array 128 is comprised of several overlapping plates 130A, B, C each shallowly inclined up from the horizontal. An inclination on the order of 5°-15° is contemplated although this is not critical. The cyclonic flow in the device shown is clockwise and the leading edge thereto of each plate 130A, B, C is elevated to intercept this flow. Three plates 130A, B, C are shown which minimizes the costs of construction but different numbers of plates can be used.

The plates 130, A, B, C are preferably semi-circular and the overall shape of the array 128 is circular and its axis substantially aligned with the cyclonic air flow induced in the collection chamber 74, with any such flow near the bottom intercepted by the baffle plate array 128 located above and covering a central area of the bottom wall 77 as indicated.

The lower end of each baffle plate 130A, B, C is covered by the overlapping upper end of another plate 130A, B, C in the array 128. The axis of each of the semicircular plates are aligned with each other and with the axis of the chamber 60.

Thus, as any cyclonic air flow at the bottom of chamber 74 seeks the outlet pipe 80, it first passes along the undersurface of one or more of the plates 130A, B, C. This causes entrained oil or other entrained droplets to contact and adhere to the undersurface of the plates 130A, B, C.

As these collect thereon, they drain to the tip of the lower end of each plate 130A, B, C due to the downward inclination of the plates 130A, B, C. The convergent angled tip shape of the lower end of each plate 130A, B, C tends to allow coalescing of the collected oil droplets into larger drops which readily drips off the tip of each of the lower ends of the plates 130A, B, C and combine with condensed oil in the bottom of the collected chamber 74. The oil drains out through fitting 86 into a sump collector or 136 as described above.

The baffle plate array 128 is supported by a center post 132 welded to floor 77 and to plate 130A holding it in the inclined position. A pair of standoff rods 134 connect plates 130B and 130C to plate 130A held in the axially spaced apart inclined position shown.

Figure 24:
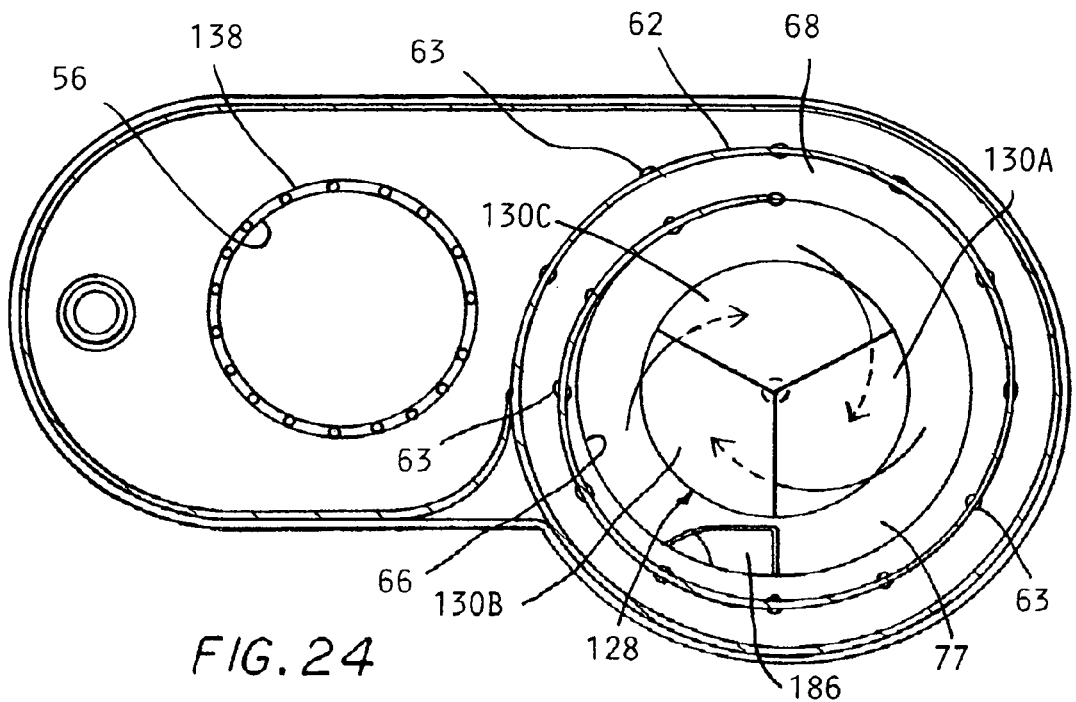
FIG. 24 is a top view of the section 24-24 in FIG. 21
Figure 25:
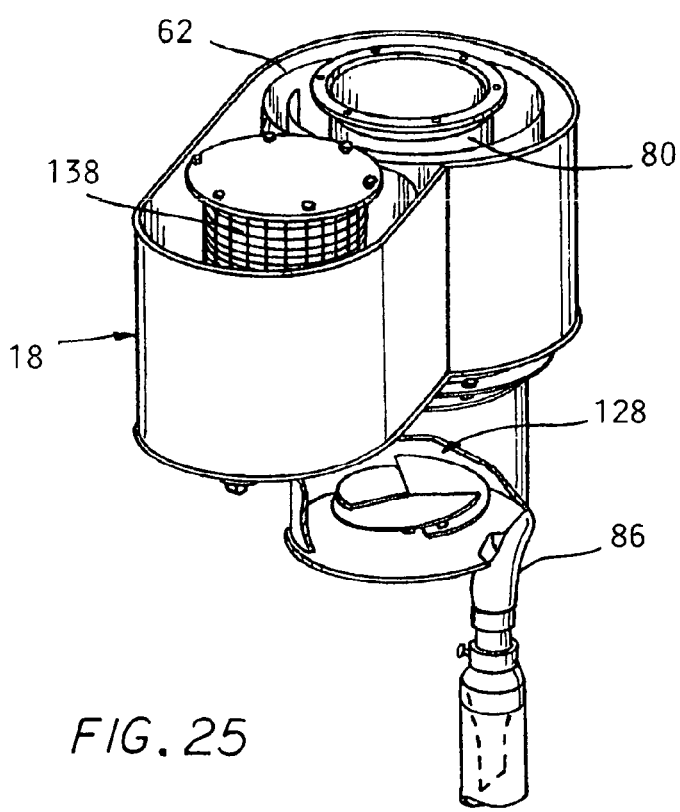
FIG. 25 is a pictorial view of the device shown in FIGS. 21-23.
Figure 26:
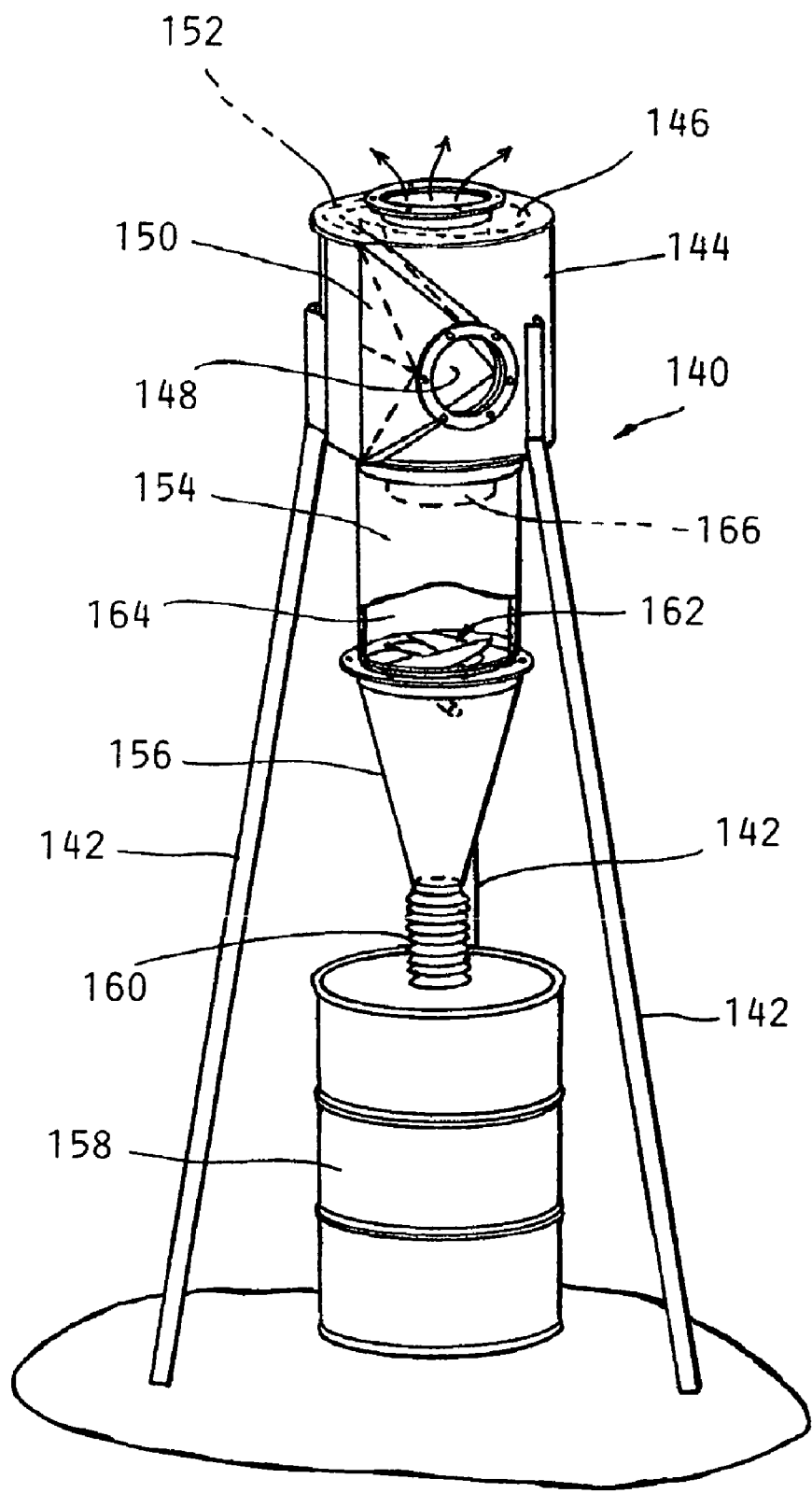
FIG. 26 is a pictorial view of an air dispersed solid removal device of the present invention.
Figure 27:
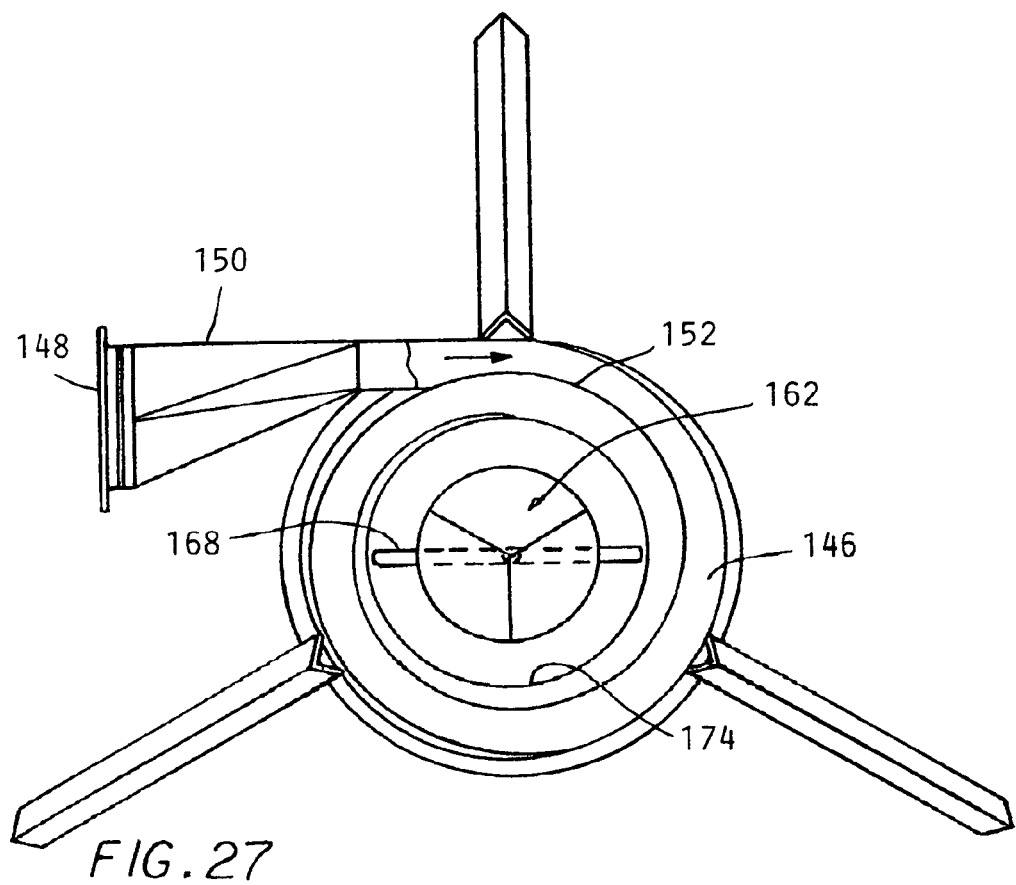
FIG. 27 is a top view of the device shown in FIG. 26 with the top removed.
Figure 28:
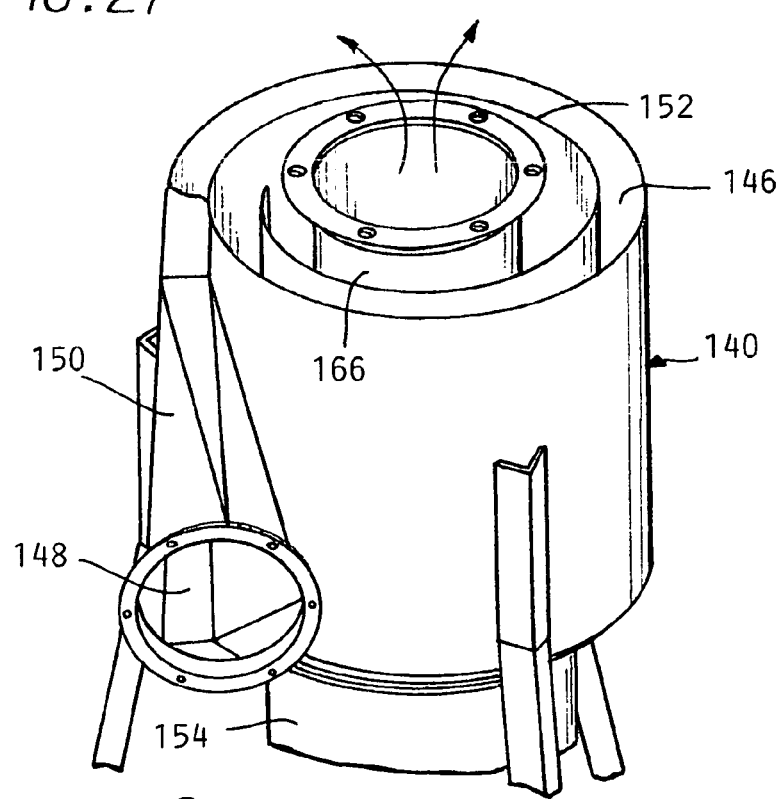
FIG. 28 is a pictorial view of the upper part of the device shown in FIGS. 26 and 27.

FIGS. 24 and 25—show a mesh screen aligned with the air inlet opening 48 which is provided to prevent dropped rags, paper towels, etc from being drawn into the cyclonic chamber 60 which could be difficult to remove.

In the past, dust removal/collector devices have been required to be very tall in order to insure complete settling out of the dust. By using the baffle arrangement described above, such removal devices can be made much shorter.

FIGS. 26-30 show a contaminant removal device for air dispersed fine solids (i.e., dust) which is supported to be elevated above the floor on tripod poles 142 welded or otherwise attached to the exterior wall 144 of an open bottom cyclonic chamber 146.

An air inlet 148 is formed at an end of a transition piece 150 which directs inlet air into the entrance of space between a spiral wall 152 configured as described above.

An open bottomed collection chamber 154 is disposed below the chamber 146 which received accumulated dust from the chamber 146.

A funnel piece 156 is attached below the collection chamber 154 to funnel collected dust into a receptacle 158 via a flexible fitting 160.

A baffle plate arrangement 162 configured as described above is installed centered above a central area of the bottom wall of the collection chamber 164 to remove entrained dust in the air passing back up to an air exit tube 166. Three semicircular inclined plates 170A, B, C are provided welded to a vertical support 172.

Figure 29:
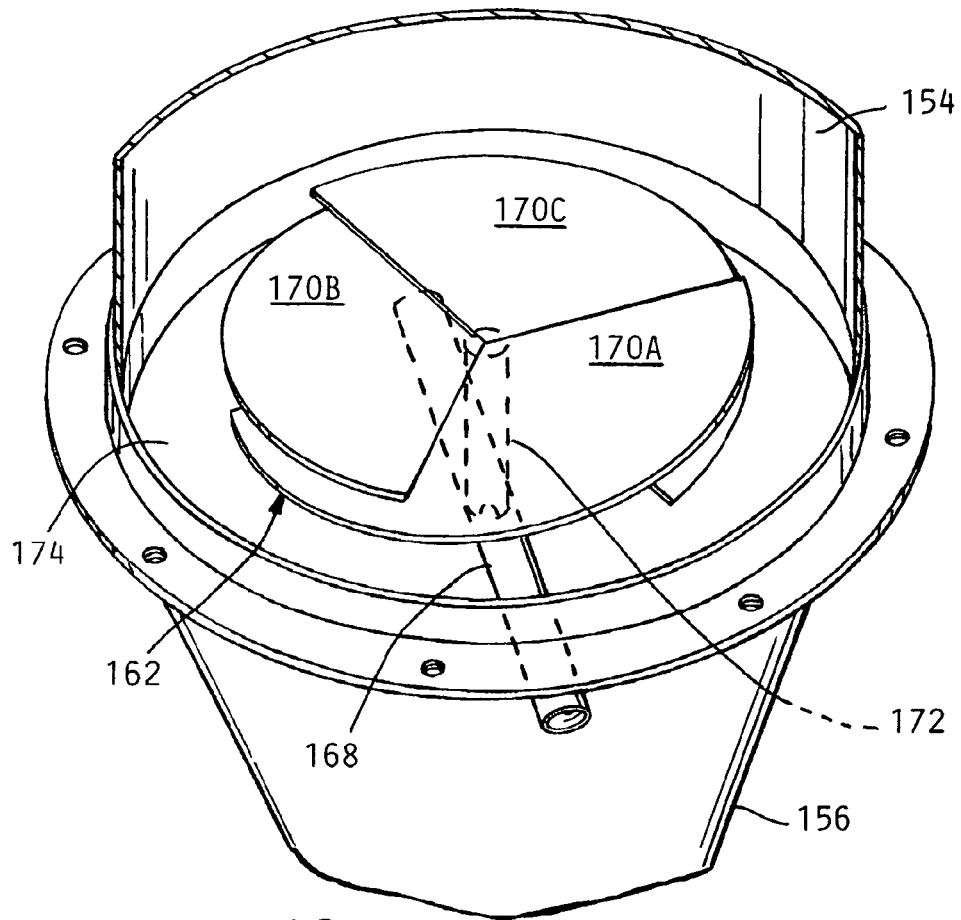
FIG. 29 is a pictorial view of a fragmentary portion of the device shown in FIGS. 26-28.
Figure 30:
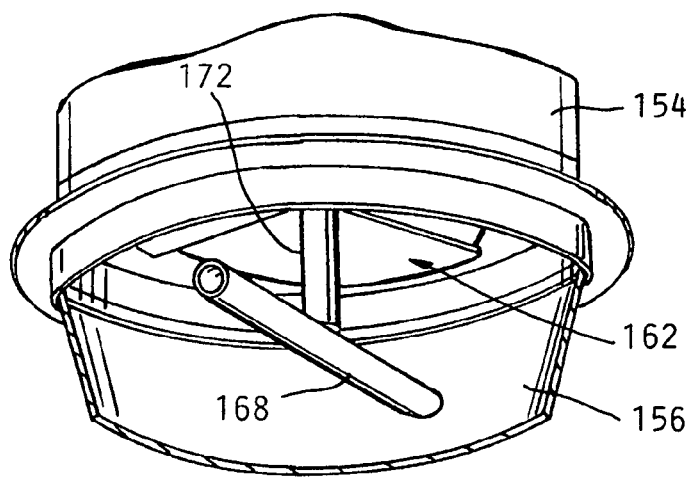
FIG. 30 is a fragmentary side view of the portion of the device shown in FIGS. 26-28.

A cross pipe support 168 is welded to crossing the inside of the funnel piece 156. As best seen in FIG. 29 an annular opening at the bottom of the collection chamber 154 allows dust to drop off the plates 170A, B, C and into the funnel piece 151.

The dust or other solid particle accumulation is typically slow such that the receptacle needs to be emptied only periodically.

The heights of the collection chamber 154 is much shorter than in prior such devises due to the improved collection produced by the presence of the baffle plate array.

The invention claimed is:

1. A removal device for collecting air dispersed contaminant particles of the type having a spiral coil wall having inwardly extending turns within a housing chamber defining a spiral flow path into which is directed a tangential flow of air containing dispersed particles to cause flow thereof inwardly through said spiral path causing particles to collect on said spiral coil wall, said spiral coil wall extending about a vertical axis;

a collection tank located beneath said spiral coil wall and receiving collected particles dropping from said spiral coil wall; and an arrangement of partially overlapping vertically spaced apart baffle plates disposed above the bottom of said collection chamber covering a central area thereof; each of said baffle plates shallowly inclined from the horizontal.

2. The removal device according to claim 1 wherein each plate has a lower end with a convergent tip to promote dripping of collected liquid contaminants.

3. The removal device according to claim 1 wherein each of said baffle plates are semi-circularly shaped and having their centers aligned, but partially rotated out of alignment with each other.

4. The removal device according to claim 1 wherein each of said baffle plates are semi-circularly shaped and having their centers aligned, but partially rotated out of alignment with each other and wherein each baffle plate has a lower end overlain by an upper end of another baffle plate creating said partial overlapping of said baffle plates.

5. The removal device according to claim 1 wherein each of said baffle plates are semi-circularly shaped and having their centers aligned, but partially rotated out of alignment with each other wherein said baffle plate array forms a generally circular array having an axis aligned with said cyclonic chamber.

6. The removal device according to claim 1 wherein each of said baffle plates are semi circularly shaped and having their centers aligned, but partially rotated out of alignment with each other, and wherein said baffle plate array forms a generally circular array having an axis aligned with said cyclonic chamber with an annular opening past said baffle plate array extending around said baffle plate array allowing removed particles to pass out of said collection chamber.

7. A method for removing air dispersed contaminant particles comprising directing air containing said particles into a space between a spiral wall in a cyclonic chamber in a direction of decreasing wall curvature;

disposing a collection chamber below said spiral wall, axially aligned therewith and open to said spiral wall space to collect particles falling from said wall;

providing an air outlet pipe extending up from within said collection chamber and through said cyclonic chamber surrounded by said spiral wall;

locating a circular array of partially overlapping baffle plates at the bottom of said collection chamber, said plates inclined shallowly from the horizontal, whereby demisted air flowing radially inward at the bottom of said collection chamber intercepts said baffle plates such that oil particles in said air flow tends to be deposited on undersides of said plates and to drop back into said collection chamber said plates inclined so that the air flow first encounters the higher side of each baffle plate.

* * * * *